May 15, 1956

R. E. McCOY 2,746,037

SPACED LOOP DIRECTION FINDER

Filed May 28, 1952

INVENTOR.
Robert E. McCoy
BY
Harry M. Saragovitz
ATTORNEY

*Fig. 3ª.*

INVENTOR.
ROBERT M. McCOY

May 15, 1956  R. E. McCOY  2,746,037
SPACED LOOP DIRECTION FINDER
Filed May 28, 1952  4 Sheets-Sheet 3

θ = AZIMUTH

INVENTOR.
ROBERT M. McCOY
BY
Harry M. Saragovitz
ATTORNEY

May 15, 1956 R. E. McCOY 2,746,037
SPACED LOOP DIRECTION FINDER
Filed May 28, 1952 4 Sheets-Sheet 4
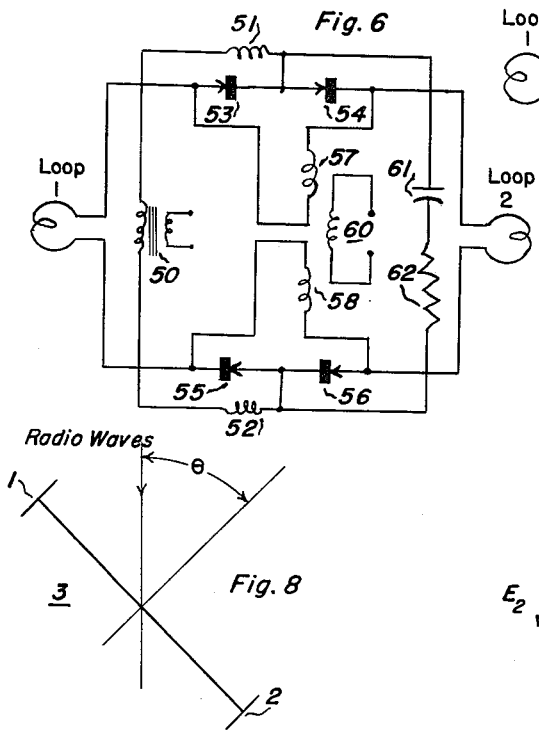
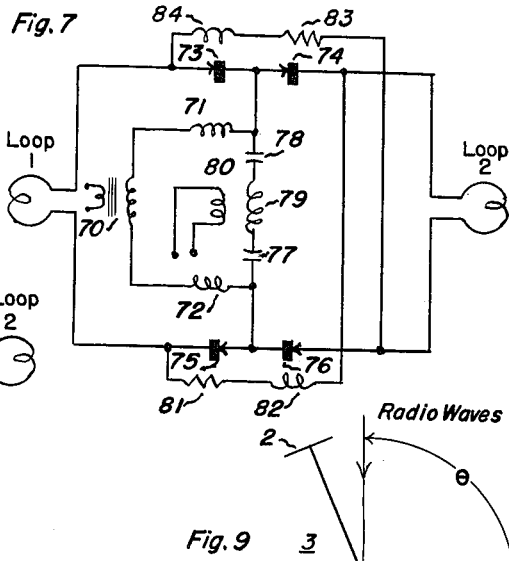
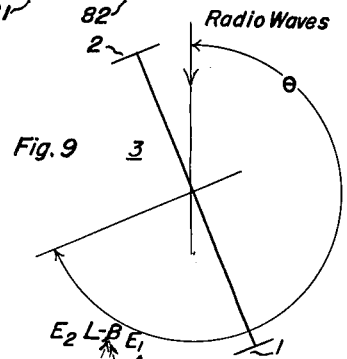
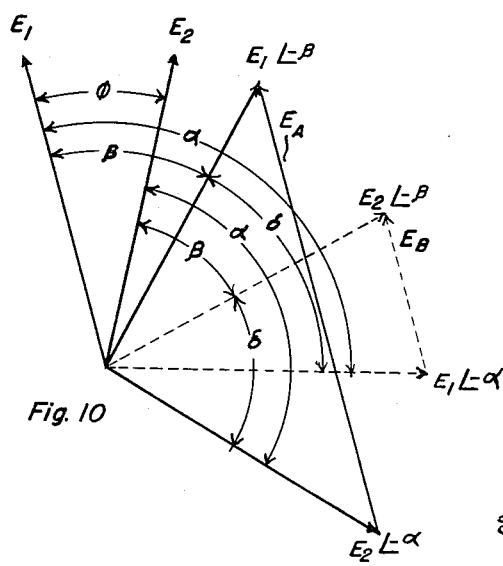
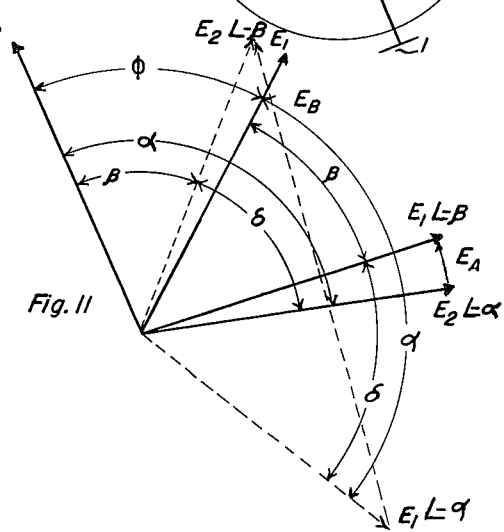
Inventor
Robert E. McCoy
By Harry M. Saragovitz
Attorney

United States Patent Office 2,746,037
Patented May 15, 1956

2,746,037

SPACED LOOP DIRECTION FINDER

Robert E. McCoy, Los Angeles, Calif., assignor to the United States of America as represented by the Secretary of the Army Application May 28, 1952, Serial No. 290,615

14 Claims. (Cl. 343—118)

(Granted under Title 35, U. S. Code (1952), sec. 266)

The invention described herein may be manufactured and used by or for the Government for governmental purposes without the payment to me of any royalty thereon.

The present invention relates to radio direction finders and, more particularly, to a radio direction finder suitable for operation in several of the higher radio frequency bands.

In previous spaced loop direction finders, the radio frequency voltages from the loops have been combined directly in series or parallel opposition, and great care has been taken to avoid any relative phase shift between the two voltages. In the present invention, a phase shifting network is introduced between the loops to produce a relative phase shift between the two loop voltages. If this phase shift is periodically switched between the two loop voltages at a frequency $f_1$, the amplitude of the combined R.-F. output signals is modulated at this frequency.

The output signals of the system coupled to the antenna array are dependent upon the direction of arrival of radio waves with respect to the spaced loops. This is also true of conventional spaced loop systems but in addition, the present apparatus produces a polarity reversal in the system output signals at two points, 180 degrees apart, corresponding to the spacing nulls in the conventional spaced loop direction finder.

In a manually operated direction finder according to the present invention, apparatus is provided for indicating both the polarity and the amplitude of the receiver output signals at frequency $f_1$. By observing which way the polarity changes as the antenna array is rotated past a spacing null, the operator can distinguish the direct from the reciprocal direction of the incoming radio waves.

In an automatic form of the invention, the antenna is rotated at a frequency $f_0$, so that the modulated receiver output signals at frequency $f_1$ become further modulated at frequency $f_0$ and the system output signals reverse polarity at 180 degree intervals of rotation. The receiver output signals are detected by first circuits sensitive to magnitude and by second circuits sensitive to both magnitude and polarity at frequency $f_1$. The former is used to control the radial length of a cathode-ray-tube trace rotating in synchronism with the antenna array and the latter to control the intensity of the trace. Thus, a propeller-like pattern is produced on the cathode ray tube screen, each lobe of the pattern corresponding to a null of the detector output and pointing out a direction on a compass rosette around the screen. The output signals of the polarity sensitive circuits at frequency $f_0$ are shifted in phase so that positive and negative peaks occur at times corresponding to the spacing nulls, and the intensity of the electron beam in the cathode ray tube is increased or decreased accordingly so that half of the trace on the cathode ray tube screen is suppressed. The remainder forms a distinctly one sided pattern on the screen, with one prominent lobe pointing out the direction of the incoming radio waves.

In accordance with the above, it is the primary object of this invention to provide a radio direction finder utilizing a spaced loop antenna array arranged to indicate the absolute direction of propagation of intercepted radio waves.

It is another object of this invention to provide a radio direction finder utilizing a spaced loop antenna array in combination with a phase shifting network to indicate the absolute direction of travel of intercepted radio waves.

It is a further object of this invention to provide a radio direction finder utilizing a pair of loop antennas in parallel spaced relation associated with a phase shifting network to generate output signals indicative of the direction of propagation of intercepted radio waves.

It is still a further object of this invention to provide a radio direction finder utilizing a pair of loop antennas in parallel spaced relation alternately connected to a phase shifting network to generate signals that are indicative of the direction of travel of the intercepted radio waves and circuits responsive to such signals for indicating the direction of travel of such radio waves.

It is yet another object of this invention to provide a radio direction finder utilizing a pair of loop antennas in spaced parallel relation alternately connected to a phase shifting network, the output signals from the antennas and network being coupled to a cathode ray tube indicator for displaying the direction of travel of the radio waves.

It is still another object of this invention to provide a radio direction finder utilizing a pair of loop antennas in spaced parallel relation and a phase shifting network, such network being electronically switched between the loop antennas and producing output signals which are coupled to indicating apparatus to show the direction of travel of intercepted radio waves.

These and further objects of this invention will be more fully understood when the following description is read in connection with the drawing wherein:

Figs. 3a and 3b illustrate voltage waveforms at various points in Fig. 1;

Figs. 6 and 7 show schematic diagram of two different types of phasing networks which may be utilized in the invention;

Figs. 8 and 9 are diagrams showing the antenna array in relation to incoming radio waves; and Figs. 10 and 11 are vector diagrams of voltages generated by the spaced loop antenna array.

Figure 1:
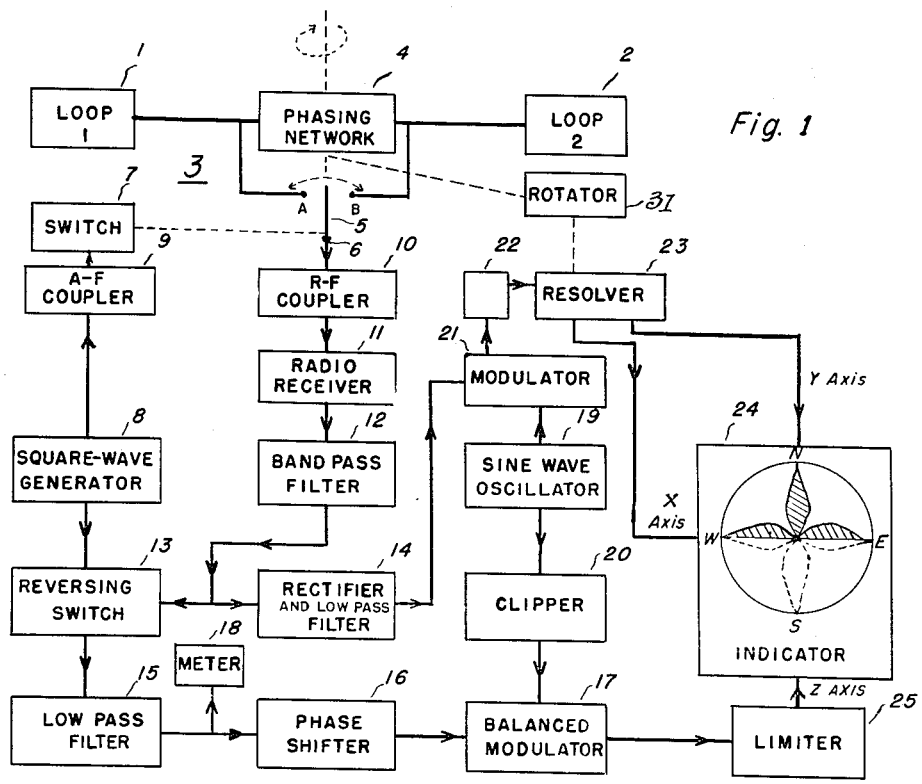
Fig. 1 shows a schematic diagram in block form of the direction finder.

Referring now to the invention in more detail, reference is made to Fig. 1 which illustrates the overall system. In Fig. 1, loop antennas 1 and 2 which comprise an antenna array 3 are positioned at the ends of a supporting rod which may be of any convenient length and which for simplicity is not shown structurally.

A conventional rotator 31 is mechanically connected to the array 3 in any well known manner. The rotator 31 may comprise, for example, a follow up system that will allow an operator to manually rotate the array 3 to any desired position. The rotator 31 also may include a driving motor, which in the example given, may be the final driving motor of the follow up system, for continuously rotating the array 3 at a predetermined speed. The array may also be rotated by any directly coupled mechanical means such as a gear train and manual driving handle.

The loops 1 and 2 are electrically connected to a phasing network 4 together with two contacts A and B. An arm 5 actuated by an electrical switch control element 7 alternately engages two terminals A and B of the phasing network 1 connecting one or the other to output terminal 6. A square-wave generator 8 is connected to the stator of an audio frequency coupler 9, the rotor of this coupler beign joined to switch 7. An output terminal 6 is attached electrically to the rotor of a radio frequency coupler 10 and the stator of this coupler is connected to a radio receiver 11 which may be of any conventional type including detection and amplification circuits, its output being fed to a band-pass filter 12. Couplers 9, 10 and couplers 22, 23 mentioned below, are of conventional design and may be inductive, such as relatively movable coils or conductive, such as a slip ring arrangement.

The output signals from filter 12 are fed to both a reversing switch 13 and a rectifier and low pass filter 14. The output signals from square wave generator 8 are also coupled to the reversing switch 13, which is electrically joined to a low pass filter 15, the output terminals of which are coupled to a balanced modulator 17 through a phase shifter 16. Connected to the output terminal of filter 15 is a meter 18, preferably responsive to voltage.

The output signals from a sine wave oscillator 19 are coupled to balanced modulator 17 through a clipper 20 and are also fed to a modulator 21. The signals from the rectifier and low pass filter 14 are passed to modulator 21. The output signals from modulator 21 are coupled to a resolver 23, the operation of which is explained below, through a coupling device 22 referred to above. The resolver 23 has two output terminals, one being connected to the X or horizontal axis of a conventional cathode ray tube indicator 24 and the other being joined to the Y or vertical axis of indicator 24. The output terminals of balanced modulator 17 are coupled to the Z or intensity grid of indicator 24 by a conventional limiter 25.

A general discussion of the fundamental theory forming the basis of this system will be helpful to a more complete understanding of the invention.

Referring to Figs. 1 and 8–11, the two loops with a phase shifting network and indicating circuits are shown, together with two vector diagrams which will be used in explaining the theory of operation of the spaced loop direction finder.

The array 3 of Fig. 1 consists of two loops 1 and 2 with a phasing network 4 between the loops. The phasing network is placed in the output of loops 1 and 2 alternately by switch 7 in order to add a fixed phase shift to the loop voltages.

Fig. 8 shows the antenna array 3 in relation to incoming radio waves, the direction of which must be determined. It can be seen that the incoming signals will generate a voltage designated $E_1$ in loop 1 and $E_2$ in loop 2. Due to the time lag a given wave front will have in traveling from loop 1 to loop 2, the voltage $E_2$ will lag the voltage $E_1$ by an angle dependent upon the position of the array, the distance between the two loops and the wave length of the incoming signals. This lag is designated as an angle $\phi$, as indicated on the vector diagram illustrated in Fig. 10. The voltages $E_1$ and $E_2$ generated in the loops will be shifted in phase a fixed angle designated $\beta$ at the antenna output terminal 6 due to the distance between the loops and terminal 6.

Assuming arm 5 of switch 7 is in position A and the antenna array is in the position illustrated in Fig. 8, the loop voltages will be as shown in Fig. 10. $E_1$ and $E_2$ are at an angle $\phi$, $E_2$ lagging $E_1$ since loop 1 intercepts the radio signals before loop 2. $E_1 \angle -\beta$ represents the voltage from loop 1 at output terminal 6, this angle representing the time for the voltage $E_1$ to travel from loop 1 to terminal 6. The voltage $E_2$ is also subject to this time lag plus an additional angle of phase shift due to the phasing network 4. This additional angle is designated $\delta$ and may be of any convenient magnitude, for example, about 60 degrees as shown. The angle $\beta$ plus the angle $\delta$ is designated as angle $\alpha$. A voltage $E_A$ at terminal 6 is the resultant of the differential combination of voltages $E_1 \angle -\beta$ and $E_2 \angle -\alpha$.

When arm 5 is in position B, the phasing network 4 shifts the phase of voltage $E_1$ by the angle $\delta$. The resulting positions of voltages $E_1$ and $E_2$ are shown in broken lines in Fig. 10. The differential combination of voltage $E_1 \angle -\alpha$ and $E_2 \angle -\beta$ results in voltage $E_B$, which has the same phase as $E_A$ but is of a different magnitude. For clarity, the various angles between the voltages are marked on the vector diagram in Fig. 10.

Fig. 9 shows the antenna array in a position where loop 2 is nearer the source of radio signals, thus causing a reversal of the voltage vectors as illustrated in Fig. 11. The same symbols are used in this diagram as were used in the diagram of Fig. 10, and the analysis is substantially the same. Briefly, since loop 2 will intercept the radio signals first, voltage $E_2$ will lead voltage $E_1$ in phase relation, the angle $\phi$ between the voltages being greater than in Fig. 10 since the wave front has a greater distance to travel between loops 1 and 2 in this example. Using the principles applied to Fig. 10, it is found that the $E_A$ and $E_B$ of Fig. 11 are in phase but again differ in magnitude, only in this instance $E_A$ has the smaller amplitude.

Making a more general observation from the above facts, it can be seen from Figs. 8 and 9 that if the array is rotated clockwise, the angle $\phi$ will approach a maximum value as the azimuth angle $\theta$ approaches 90 degrees. As the array is rotated past 90 degrees, the angle $\phi$ will start decreasing, becoming zero when $\theta$ is 180 degrees. At this point an important observation must be made, i. e., as the antenna is further rotated clockwise, loop 2 will intercept the radio waves first and consequently, voltage $E_2$ will lead voltage $E_1$. This will be more clearly understood if Fig. 11 is consulted. It can be seen that $E_1$ and $E_2$ will again begin to swing apart at an angle $\phi$ but in the opposite direction. As $\theta$ approaches 270 degrees, $\phi$ will again approach a maximum and further clockwise rotation of the array will cause voltages $E_1$ and $E_2$ to swing together until $\phi$ becomes zero when $\theta$ becomes zero degrees.

It is noted that as the array is rotated clockwise past zero degrees azimuth, voltage $E_2$ will change from the leading to the lagging voltage and as the array is rotated past 180 degrees azimuth, $E_2$ will change from the lagging to the leading voltage. These changes will necessarily cause the following, which can be more easily seen from an inspection of Figs. 10 and 11, i. e., that $E_A$ and $E_B$ will be equal in magnitude when $\theta$ is zero degrees or 180 degrees and $E_A$ and $E_B$ will differ in magnitude at all intermediate azimuths. As the array 3 is rotated clockwise from zero degrees azimuth to 180 degrees azimuth, $E_A$ will be greater in amplitude than $E_B$ and as rotation is continued from 180 degrees to 360 degrees, $E_A$ will be lesser in amplitude than $E_B$.

It is to be noted that as the array 3 is rotated, the voltages $E_1$ and $E_2$ will change amplitude due to loop directivity, and if the incoming waves are all vertically polarized, at $\theta$ equals 90 degrees and 270 degrees, $E_1$ and $E_2$ will be zero. However, this loop directivity has only the effect of changing the amplitude of the vectors in Figs. 10 and 11, the angles between these vectors being unaffected. The nulls due to loop directivity, hereinafter designated loop nulls, have been in the past a source of false indications, but such error is remedied by the invention as explained below.

If the array 3 is rotated 360 degrees, the loops 1 and 2 being differentially connected, it is obvious that, with or without the phasing network and switching, if the incoming waves are vertically polarized, there will be four nulls occurring at 0 degrees, 90 degrees, 180 degrees and 270 degrees. Two of these nulls, i. e., those at 0 degrees and 180 degrees are designated spacing nulls and the remaining two at 90 degrees and 270 degrees are designated loop nulls. If the waves are not vertically polarized, loop nulls may occur at azimuths other than 90 and 270 degrees while the spacing nulls remain at 0 and 180 degrees. Both $E_A$ and $E_B$ vanish at the loop nulls, if any, but at other azimuths they have appreciable amplitudes which differ, except at the spacing nulls, where $E_A$ and $E_B$ are equal as their difference changes sign. At loop nulls, the $E_A$ and $E_B$ becomes zero so that their difference dips to zero but does not change sign. Therefore, measurements responsive to polarity can be utilized to distinguish one null from the other.

It is seen from the above that an envelope of the intercepted carrier frequency, modulated at the switching frequency, will be coupled from terminal 6 to radio receiver 11. This envelope will be detected by receiver 11 and the resulting signal applied to reversing switch 13 through filter 12. The output voltage from switch 13 will correspond in magnitude and polarity to the algebraic difference between the amplitudes of $E_A$ and $E_B$. This difference voltage is then applied through low pass filter 15, to remove any ripple, to meter 18 and the automatic indicating circuits which will be explained in detail below.

With these basic facts clearly in mind, the operation of the invention will be more easily understood.

In the explanation of the operation of the invention, the waveforms shown in Fig. 3 will be referred to in order to facilitate a complete understanding of the system.

The direction finder may be used manually, or with additional circuits, automatically. For manual operation, the operator sets rotator 31 for follow up operation so that the spaced loop array 3 can be easily and accurately controlled. It is to be understood that any type of apparatus similar in action to a follow up system may be utilized to position the array so that the invention is not limited to any specified type of driving apparatus for the array. It is assumed for ease of explanation that the incoming signal is from due north, as shown in Figs. 8 and 9. The square-wave generator 8 may operate at any convenient frequency, the upper limit determined chiefly by the switch 7. As pointed out above, switch 7 is illustrated for clarity as a mechanical switch but electronic switches such as illustrated in Figs. 6 and 7 are preferable. The square wave output signal from generator 8 is applied to switch 7 through A.-F. coupler 9, which may comprise conductive coupling such as slip rings or inductive coupling such as coupled coils. As the arm 5 alternately contacts terminals A and B, the R.-F. energy is fed to radio receiver 11 as two different voltages $E_A$ and $E_B$ through R.-F. coupler 10, which may be similar to the A.-F. coupler. Input transformer 50 and output transformer 60, in Figure 6 represent, respectively, one type of audio frequency and radio frequency couplers which may be used in the exercise of the invention. The R.-F. voltages $E_A$ and $E_B$ are detected in receiver 11 and the resultant signal applied to reversing switch 13 through band pass filter 12. Switch 13 is controlled by the square wave generator 8 and therefore reverses polarity at the same time switch 7 causes arm 5 to change terminals. The resulting signal from switch 13 is applied through filter 15 to meter 18, which is preferably a zero center D.-C. voltmeter although a substitute such as the twin eye electron ray tube shown in U. S. Patent 2,397,128 to Cole and McCoy may be used.

Figure 3B:
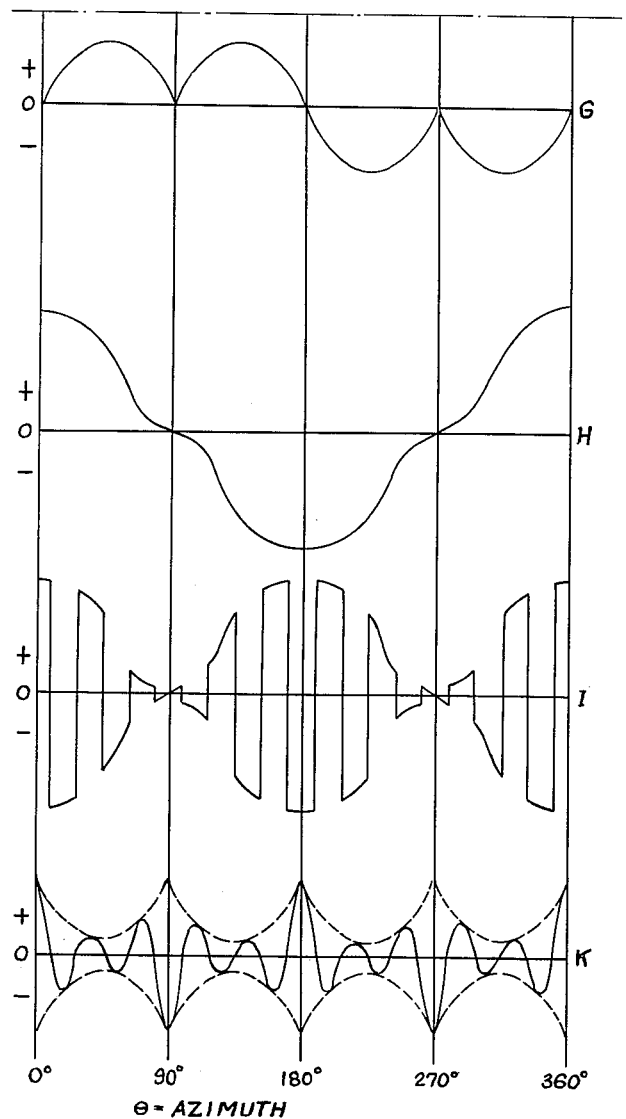

As explained above, as the array 3 is rotated, the voltage output from reversing switch 13 will take the form of curve G in Fig. 3b if the incoming waves are vertically polarized. If the waves are not of such polarization than the nulls shown at 90 and 270 degrees may shift to other positions or become merely minima. When this voltage is applied to meter 18, it is relatively simple to determine the azimuth of the incoming waves by the following method. The array is rotated and the meter pointer observed. When the pointer merely dips toward zero and then recedes, the array is at one of the loop's nulls. As the array 3 is rotated further, the pointer will cross the zero mark of meter 18 due to the change in polarity of the voltage output from switch 13. Such crossing can be in either of two directions and indicates a spacing null. By suitable connections to meter 18, the pointer may be made to swing across the zero mark in the same direction as the antenna array 3 is rotated when the array is pointed at the direct null, thus simplifying the observation of the azimuth of the incoming radio signals.

For automatic operation of the direction finder, additional circuits and apparatus are necessary. The rotator 31 is adjusted to rotate the spaced loop antenna array 3 at a frequency $f_0$, this frequency being as high as possible considering the structural limitations of the array 3. The curves of Fig. 3b have a time base corresponding to the azimuth of the array. The curves were plotted with the switching frequency $f_1$ only a relatively small multiple of the frequency $f_0$ for clarity and ease of explanation. However, for accurate and sharp indication, $f_1$ must be of the order of several hundred times $f_0$.

As the array 3 is rotated, an R.-F. envelope shown by curve C will be developed due to the alternate application of a phase shift to the loop voltages $E_1$ and $E_2$, which, as explained above, will cause voltages $E_A$ and $E_B$ to vary in magnitude at most azimuths of the array 3.

The R.-F. modulated waveform is detected by the radio receiver 11, and a signal represented by curve D is the resultant waveform. Negative D.-C. polarity is shown in accordance with common practice, although positive polarity would be equally acceptable. The signal D is passed through the band pass filter 12, designed to pass frequencies from $.5 f_1$ to $1.5 f_1$, which blocks the D.-C. component, and most of the components at rotation frequency $f_0$ or its higher harmonics, passing only the components shown by curve E. This curve is essentially a wave of frequency $f_1$, modulated at twice the rotation frequency $f_0$.

Rectifier and low pass filter 14 generates waveform F, while the combination of reversing switch 13 and low pass filter 15 generates waveform G, the reversal of polarity of waveform G at 0 and 180 degrees being due to the discontinuity of signal E at 0 and 180 degrees and switch 13, which is controlled by the square wave from generator 8.

Referring to the cathode ray tube deflection path which includes rectifier 14, modulator 21, coupler 22 and resolver 23, the signal F is first fed to modulator 21 where it acts as a modulating signal. The signal to be modulated is generated by sine wave oscillator 19 at a frequency $f_2$, shown as only a small multiple of rotation frequency $f_0$ for clarity in plotting the curves, but in actual practice several hundred times as great as frequency $f_0$.

The composite output wave from modulator 21 is represented by curve K and is applied to resolver 23 by coupler 22. The two output voltages of resolver 23 are fed to the X and Y axes of cathode ray tube indicator 24, to be used in deflecting the electron beam in any conventional manner such as electrostatic deflection. The stator of resolver 23 produces these two output voltages, one proportional to sin $\theta$ and the other proportional to cos $\theta$, and both proportional to the amplitude of the rotor input signal K. Therefore, the trace produced on the screen of the cathode ray tube sweeps radially in proportion to the output voltage of modulator 21. During positive half-cycles of modulator output signal K, the trace sweeps out and in at an angle corresponding to the instantaneous azimuth $\theta$ of the array; and during negative half-cycles, the trace sweeps out and in on the opposite side of the screen center, indicating an azimuth 180 degrees different.

At this point, the pattern on the indicating screen would resemble a four bladed propeller with tips pointing out the spacing nulls and the loop nulls on a compass rosette around the screen. Similar results could be obtained in the prior art by connecting the output signals from receiver 11 directly to modulator 21, omitting phasing network 4, switch 7, band pass filter 12, and rectifier 14. However, inclusion of these elements together with reversing switch 13 and the elements that follow it permit elimination of the ambiguity in the indication.

Referring to the cathode ray tube blanking path which includes switch 13, filter 15, phase shifter 16, balanced modulator 17 and limiter 25, the signal G from switch 13 is first applied to phase shifter 16 through low pass filter 15. These two circuits perform the function of smoothing waveform G to waveform H and shifting waveform H 90 degrees to place it in the relative position illustrated in Fig. 3b with respect to waveform G.

The next step is the application of signal H to the balanced modulator 17, this signal being the modulating voltage. A second output signal from sine wave oscillator 19 is preferably coupled to balanced modulator 17 through clipper 20, which performs the function of changing the sinusoidal output signal from oscillator 19 to a modified rectangular wave signal. This signal is modulated by signal H in balanced modulator 17, and since balanced modulation suppresses the carrier frequency, output signal I will result. This signal may be coupled to the Z axis, otherwise known as the intensity grid, of cathode ray tube indicator 24 through limiter 25, this limiter being used to protect the cathode ray tube grid from excessive voltage. The polarity of the output from oscillator 19 is so chosen that the signal I will be positive at zero azimuth when wave K swings positive. Thus, the positive swings of waveform K near 0 degrees will be traced on the screen of indicator 24.

A digression is necessary to further explain the action of the various circuit elements supplying signals to the cathode ray tube indicator 24. When the signal from oscillator 19 is modulated by waveform F, the resulting composite wave K will vary from minimum to maximum but without any phase reversals due to the modulation. However, when the carrier component is suppressed as a result of balanced modulation in circuit 17 leaving the two side band components, the phase or polarity of the resulting wave I will change when the modulating signal H changes polarity. This can be easily seen from a close examination of curve I at 90 and 270 degrees where the reversal of polarity occurs.

It follows from what has been stated that when the array 3 is at any azimuths from 0 to 90 degrees and 270 to 360 degrees, the positive half cycles of signal K will be traced on the screen of tube 24 and the negative half cycles effectively suppressed by the negative blanking voltage from signal I. From 90 to 270 degrees, the positive half cycles of signal K will be suppressed due to the polarity reversal of wave I and the negative half cycles of signal K traced on the screen, such traces covering the same portion of the screen as the positive half cycles had traced during the previous half revolution of antenna array 3 which is coupled to the deflection circuits through resolver 23. Such a trace is illustrated on the screen of indicator 24 in Fig. 1, the incoming wave being transmitted from due north. The visible portion of the trace will resemble a pointer and is shown hatched while the suppressed portions, which of course are not visible, are indicated by broken lines. It is noted that the indication is clear and free from any ambiguity since the full pointer will be bright and better defined than the two half pointers which will be positioned on both sides of the direct null pointer.

If the incoming radio waves are not vertically polarized, loop nulls may occur at different directions, not necessarily 90 degrees from the spacing nulls as shown in Fig. 3, and if the radio waves have elliptical polarization, the loop nulls degenerate into mere minima. The corresponding lobes of the trace on the indicator 24 then may shift position, or become short and round tipped, or even disappear completely. Dwindling or disappearing lobes present no problem, of course, since the main lobe still remains in view. Shifting lobes due to loop nulls may cause momentary confusion, if the shift goes far enough to allow complete blanking of one of them, leaving only two lobes in sight; but upon close observation of the screen, the main lobe, which indicates the direct azimuth, can be distinguished from the remaining loop-null trace by the fact that it is centered in the bright-trace sector. This difference becomes more readily apparent if the gain of radio receiver 11 is reduced sufficiently to prevent any clipping by limiter 25, which is provided mainly to protect the intensity-control grid from excessive voltage.

In the automatic direction finder as described, sine waves of frequency $f_2$ are supplied directly to modulator 21 from oscillator 19. Sine waves of the same frequency modified by clipper 20 to substantially rectangular shape are supplied through balanced modulator 17 and limiter 25 to indicator 24 for blanking purposes. This arrangement has the advantage of dividing the control circuits into two groups of about equal complexity which can operate independently. Failure of either group does not disable the direction finder completely but permits limited use. Thus, if any of the components in the blanking circuit fail to operate properly, sense indication is lost but an ambiguous directional indication remains as in the prior art. If any component in the deflection circuit fails, automatic indication is lost but the direction finder may be manually operated utilizing the meter 18 as explained above.

Figure 4:
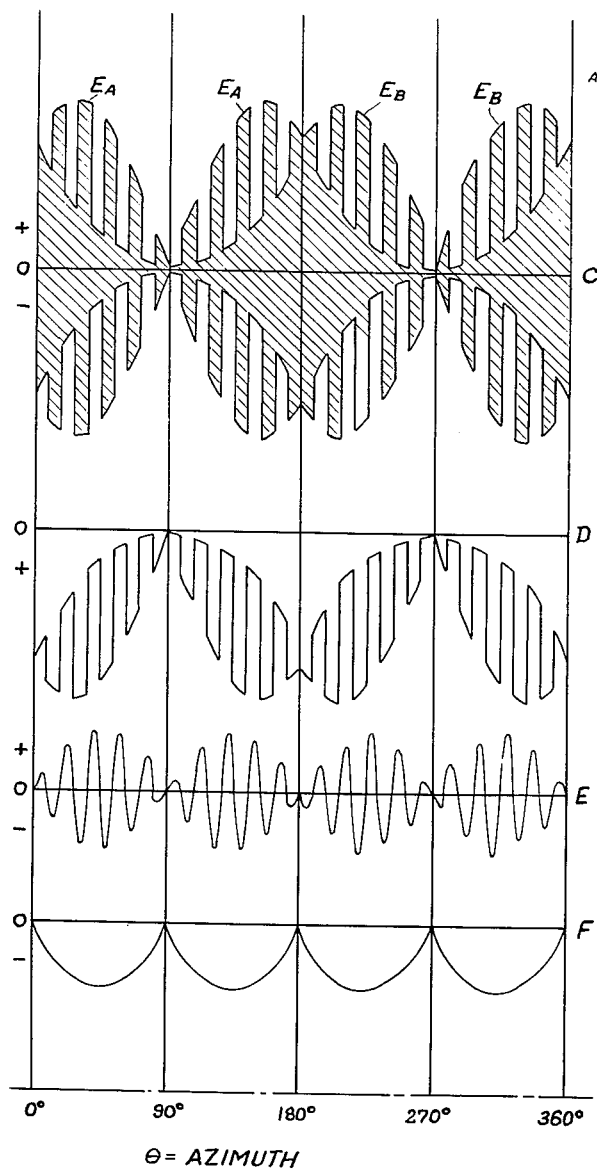
Fig. 4 is a further modification of Fig. 1.
Figure 4:
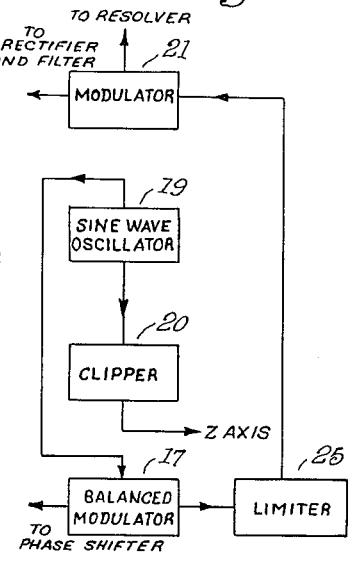
Figure 5:
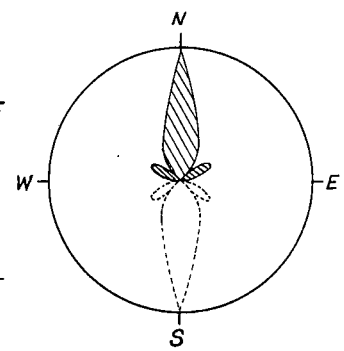
Fig. 5 illustrates the pattern generated by an indicator incorporated in the system of Fig 4.

One modification of the system shown in Fig. 1 is illustrated in Fig. 4 and the directional pattern traced on the cathode ray tube indicator 24 by such modified circuit is shown by Fig. 5. In Fig. 4, similar components previously described in connection with Fig. 1 are given like reference numerals.

The circuit grouping of Fig. 4 is less convenient than that of Fig. 1 in the event emergency operation of the direction finder is necessary. However, the resulting indication will be somewhat easier to read. The difference in the two systems is in the connection of the clipper 20 to the Z axis, the connection of the limiter 25 to modulator 21, and the coupling of the output signals from the sine wave oscillator 19 directly to the balanced modulator 17.

In this modification, the polarity of the output signal from modulator 21 is reversed whenever the antenna array 3 rotates 180 degrees because the polarity of the output signal from balanced modulator 17 reverses whenever the modulating signal H changes polarity, as explained in connection with Fig. 1. The signals from clipper 20 are applied to the Z axis for blanking. In this modification, the deflection voltage instead of the blanking voltage changes polarity every 180 degrees, and since there is still a relative phase reversal, only the direct null will be indicated on cathode ray indicator 24 as shown in Fig. 5.

In this modification, because the amplitude of the output signal from balanced modulator 17 must become very small near the reversals of polarity at azimuths 90 and 270 degrees, the radial length of traces on the screen in directions near 90 and 270 degrees from the indicated azimuth are very small, and the side lobes of the pattern corresponding to the loop nulls become appreciably shorter than the main direct spacing lobe. This is easily seen in Fig. 5 where the cross-hatched sections correspond to the visible trace and the dotted portions the reciprocal trace which is blanked out.

Figure 2:
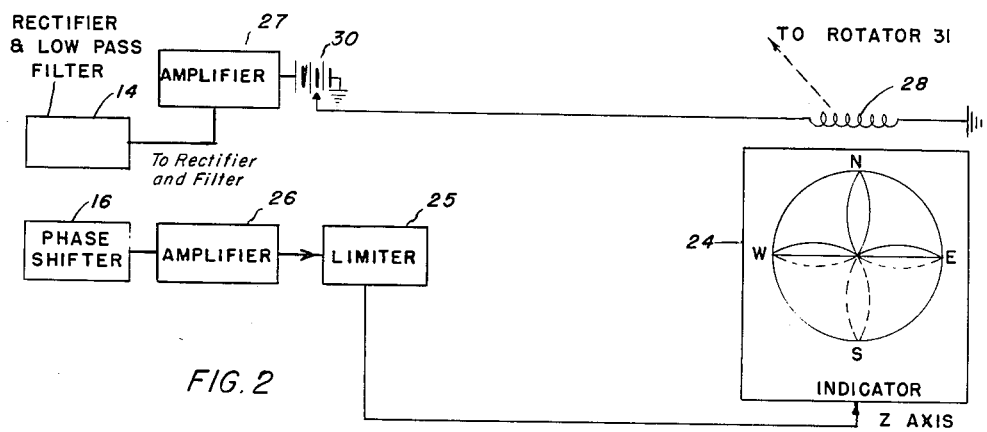
Fig. 2 is a modification of Fig. 1.

Another modification of the direction finder is illustrated in Fig. 2, the use of this circuit resulting in an indication on the screen of tube 24 similar to the display of Fig. 1 except the trace is an open pattern, i. e., the outline of the cross-hatched pattern is traced on the screen of the tube indicator 24. The circuit changes necessary to produce this pattern include omitting oscillator 19 and clipper 20, changing balanced modulator 17 and modulator 21 to simple amplifiers 26 and 27 and omitting resolver 23 and adding a substitute deflection system. This system preferably includes a coil 28 which is rotated about the cathode ray tube axis in synchronism with the rotation of the antenna array 3. Such rotation may be accomplished by any type of mechanical gearing or electrical follow-up type system which are both well known in the art. It is noted that such a rotating coil could be utilized in place of the resolver 23 in Fig. 1 if desired. The signal F and an adjustable bias 30 are applied to the rotating coil 28 and the signal H is applied to the Z axis blanking circuit.

The bias is adjusted so that when the instantaneous value of signal F being fed to amplifier 27 is zero, the electron beam of cathode ray tube indicator 24 will be deflected to the edge of the screen. The signal F will overcome this bias after being amplified and the resulting trace will be an outline of the display shown in Fig. 1. The blanking voltage H will render the tube non-indicating from 90 to 270 degrees azimuth.

The use of the open pattern display has certain advantages since some components may be omitted. However, the shaded pattern is recommended when the rotation frequency of the array, $f_0$, is less than approximately 20 per second, which it will be in most cases. This is due to the fact that the shaded pattern arrangements double the pattern repetition rate of the indicator which tends to reduce the flicker of the pattern.

A phasing network and switching arrangement that may be utilized in this system is illustrated in Fig. 6. In this network the secondary of an input transformer 50 is connected to R.-F. chokes 51 and 52. Choke 51 is connected between rectifiers 53 and 54 and choke 52 is connected between rectifiers 55 and 56. Connected across rectifiers 53, 54 is one primary 57 of an output transformer 60. Connected across rectifiers 55, 56 is the other primary 58 of transformer 60. The midpoints of rectifiers 53, 54 and 55, 56 are connected to a condenser 61 and a resistance 62. Loop 1 is connected to rectifiers 53 and 55 while loop 2 is connected to rectifiers 54 and 56.

For operation of the switching phasing network, square waves from generator 8 are applied to the primary of input transformer 50 through A.-F. coupler 9. During alternate half cycles of square waves, rectifiers 54 and 56 conduct freely making their R.-F. resistance very low while rectifiers 53 and 55 become practically non-conducting. The situation is reversed during the other half cycles of square waves. Loops 1 and 2 complete the D.-C. circuit between each pair of rectifiers and are connected, in series opposition, to primary windings 57, 58 that serve as the rotor of the R.-F. coupler 10. The resistance of the loops is negligible even in comparison with the forward resistance of a rectifier. Alternate conduction and non-conduction of rectifiers 54, 56 and 53, 55 under control of the square waves which are much greater in amplitude than the R.-F. voltages, effectively connects the series combination of resistance 62 and capacitance 61 in parallel alternately with loops 1 and 2, thereby adding a fixed increment of phase shift alternately to the loop voltages $E_1$ and $E_2$.

Fig. 7 illustrates a second form the switching phasing network may take, it being understood that the invention is not limited to the use of these networks alone as many other suitable phasing networks well known in the art could be utilized in the invention. Connected to opposite ends of the secondary of an input transformer 70 are R.-F. chokes 71 and 72. These chokes are connected to the midpoints of rectifiers 73, 74 and rectifiers 75, 76. The chokes 71 and 72 are coupled together through condensers 77 and 78 and a primary 79 of an output transformer 80. A resistance 81 and inductance 82 are connected between rectifier 74 and rectifier 75 and resistance 83 and inductance 84 are connected between rectifier 73 and rectifier 76. Loop 1 is connected to rectifiers 73 and 75 while loop 2 is connected to rectifiers 74 and 76.

For operation of this switching phasing network, square waves from generator 8 are applied to the primary of input transformer 70 through A.-F. coupler 9. During alternate half cycles of square waves, rectifiers 74 and 76 conduct freely making their R.-F. resistance very low while rectifiers 73 and 75 become practically non-conducting. The situation is reversed during the other half cycles of square waves. Loops 1 and 2 complete the D.-C. circuit between each pair of rectifiers and are connected, in parallel opposition, to the series combination of capacitors 77, 78 and coil 79 that serves as the rotor of R.-F. coupler 10. Capacitors 77, 78 have a low impedance at radio frequencies, but at audio frequencies, their impedance is very high which prevents coil 79 from short circuiting the secondary of input transformer 70. The resistance of loops 1 and 2 is negligible in comparison with the forward resistance of a rectifier. Alternate conduction and non-conduction of rectifiers 74, 76 and 73, 75 under control of the square waves which are much greater in amplitude than the R.-F. voltages, effectively connects the phasing network comprising resistances 81, 83 and inductances 82, 84 alternately in series with loops 1 and 2, thereby adding a fixed increment of phase shift alternately to the loop voltages $E_1$ and $E_2$.

While preferred embodiments of the invention have been illustrated and described, it is to be understood that various other modifications may be made that are within the spirit and scope of the invention.

What is claimed is:

1. A radio signal direction finder comprising a rotatably mounted spaced loop antenna array, means for rotating said array, said array including a pair of loop antennas in spaced apart parallel relation, said loops differentially coupled so that the voltage generated in each of said antennas are in opposition, a phase shifting network, a switching device operating at a predetermined frequency for connecting said network alternately in the output circuits of said loop antennas for shifting the relative phase angle of the antenna voltage affected by said network, means for combining said voltages into two resultant voltages, whereby said resultant voltages are of equal amplitude at two positions of said antenna array, means for demodulating said voltages, means for rectifying said demodulated voltages in accordance with the frequency and phase of said switching frequency, an indicator, said indicator responsive to said last mentioned voltage.

2. A radio signal direction finder comprising a rotatably mounted spaced loop antenna array, means for rotating said array, said array including a pair of loop antennas, said loops differentially connected so that the voltages generated in said antennas are in opposition, a phase shifting network, a switching device operating at a predetermined frequency for connecting said network alternately in the output circuits of said loops for shifting the phase angle of the loop voltage affected by said network, means for combining said voltages into two resultant voltages whereby said resultant voltages are of equal amplitude at two positions of said antenna array, means for demodulating said voltages, means for rectifying said demodulated voltages in accordance with the frequency and phase of said switching frequency and a zero center voltmeter responsive to said rectifier output signal for indicating the radio signal direction.

3. A radio signal direction finder comprising a rotatably mounted spaced loop antenna array, means for rotating said array, said array including two loop antennas in spaced parallel relation, a phase shifting network alternately connected in the output circuits of said loops by a switching device for changing the phase relations between the two loop voltages generated in response to intercepted radio signals, means for combining said phase shifted voltages to produce a resultant voltage envelope changing amplitude at the switching frequency of said device except at two positions of said array, means for deriving a signal from said envelope and for filtering undesirable frequency components from said signal, a reversing switch operating in synchronism with said switching device, said switch reversing the polarity of said filtered signal, and a zero center meter responsive to said reversed polarity signal for indicating the direction of propagation of said intercepted radio signals.

4. A radio signal direction finder comprising a rotatably mounted spaced loop antenna array, means for rotating said array, said array including two loop antennas in spaced apart parallel relation, said loops differentially connected so that the voltages generated in said antennas are in opposition, a phase shifting network, a switching device operating at a predetermined frequency for connecting said network alternately to said loops for shifting the relative phase angle of the loop voltage affected by said network, means for combining said voltages whereby the resultant voltage envelope maintains one amplitude during said switching at two positions of said antenna array, means for demodulating said voltage envelope, means for removing undesirable frequency components from said demodulated voltage, switching means for reversing the polarity of said filtered signal in accordance with the frequency of said predetermined frequency, further filter means for coupling said reversed polarity signal to a zero center voltmeter, said voltmeter being responsive to said last mentioned signal for indicating the radio signal direction.

5. A radio signal direction finder comprising a rotatably mounted spaced loop antenna array, means for rotating said array at a constant frequency, said loop antennas differentially coupled together so that the voltages generated in each of said antennas are in opposition, a phase shifting network, a switching device operating at a predetermined frequency for connecting said network alternately to said antennas for shifting the relative phase angle of the antenna voltage affected by said network, means for combining said voltages into a resultant voltage envelope whereby said voltage envelope is modulated at said switching frequency, a detector and a filter for detecting said modulated voltage envelope and removing undesired frequency components from said detected voltage, a cathode ray tube indicator having deflection circuits and a blanking circuit, said circuits responsive to the output signals from said filter for operating said indicator.

6. In a system for determining the direction of propagation of intercepted radio waves, a rotatably mounted spaced loop antenna array, means for rotating said array, said array including a pair of loop antennas in spaced apart parallel relation, said loops alternately connected to a phase shifting network by a switching device, circuit means for generating indicating signals connected to receive the output signals from said array as modified by said network, said output signals being generated in response to said radio waves, two channels responsive to said indicating signals and coupled to an indicating device, one of said channels operative to cause said indicator to exhibit ambiguously the direction of propagation of said radio waves and the other of said channels operative to remove said ambiguity.

7. In a system for determining the direction of propagation of intercepted radio signals, a rotatably mounted spaced loop antenna array, means for rotating said array, said array including a pair of loop antennas in spaced apart parallel relation, said loops alternately connected to a phase shifting network by a switching device so that a modulated voltage envelope is generated in response to said radio signals, circuit means responsive to said voltage envelope for generating an indicating signal, a cathode ray tube indicator, two indicating channels connected to said indicator, one of said channels connected to the deflection circuits of said indicator and the other of said channels connected to the intensity circuits of said indicator so that the direction of propagation of said radio signals is indicated on said cathode ray tube.

8. A system as in claim 7 wherein said two indicating channels include means to provide a shaded pattern display on said cathode ray tube.

9. A system as in claim 7 wherein said two indicating channels include means to provide an open pattern display on said cathode ray tube.

10. In a direction finding system for radio signals, a rotatably mounted spaced loop antenna array, means for rotating said array at a first frequency, said array including a pair of loops in spaced apart parallel relation, said loops alternately connected to a phase shifting network by a switching device operating at a second frequency, circuit means connected to the output terminals of said array for deriving signals by detection from the voltages generated by said array in response to said radio signals, two indicator channels connected to a cathode ray tube indicator responsive to said detected signals, one of said channels including a rectifier, a modulator and means for causing the trace on said indicator to rotate in synchronism with said array at said first frequency, the other of said channels including a reversing switch operating in synchronism with said switching device at said second frequency, a low pass filter, a phase shifter and a balanced modulator coupled to an intensity grid of said cathode ray tube indicator so that the direction of said intercepted radio signals is indicated on the cathode ray tube indicator.

11. In a direction finding system for radio signals, a rotatably mounted spaced loop antenna array, means for rotating said array at a first frequency, said array including a pair of loops in spaced apart parallel relation, an electronic switching device, said loops alternately connected to a phase shifting network by said switching device operating at a second frequency, circuit means connected to the output terminals of said array for deriving signals by detection from the voltages generated by said array in response to said radio signals, two indicator channels connected to a cathode ray tube indicator responsive to said detected signals, one of said channels including a rectifier, a modulator and means for causing the trace on said indicator to rotate in synchronism with said array at said first frequency, the other of said channels including a reversing switch operating in synchronism with said switching device at said second frequency, a low pass filter, a phase shifter and a balanced modulator coupled to an intensity grid of said cathode ray tube indicator so that the direction of said intercepted radio signals is indicated on the cathode ray tube screen.

12. A system as in claim 11 wherein said means for causing the trace on said cathode ray tube indicator to rotate includes a resolver having a rotor and stator, said rotor physically connected to said antenna array and said stator electrically coupled to said cathode ray tube indicator.

13. A system as in claim 11 wherein said means for causing the trace on said cathode ray tube indicator to rotate includes a coil associated with said cathode ray tube indicator and means for rotating said coil in synchronism with said antenna array.

14. A radio signal direction finder comprising a rotatably mounted spaced loop antenna array, means for rotating said array at a constant frequency, said array including a pair of loop antennas electrically coupled together, a phase shifting network, a switching device operating at a predetermined frequency for connecting said network alternately to said loop antennas for shifting the phase angle of the antenna voltage affected by said network, means for combining said antenna voltages so that the resultant voltage envelope will be modulated at said switching frequency, a detector and filter for detecting said modulated voltage envelope and removing undesired frequency components from said detected voltage, an indicator, and circuit means responsive to the output signals from said filter for operating said indicator.

References Cited in the file of this patent

UNITED STATES PATENTS

| | | |
|---|---|---|
| 2,160,857 | Gothe | June 6, 1939 |
| 2,361,436 | Taylor | Oct. 31, 1944 |
| 2,365,118 | Stafford | Dec. 12, 1944 |
| 2,407,659 | Fuchs | Sept. 17, 1946 |
| 2,427,660 | Colton et al. | Sept. 23, 1947 |
| 2,474,268 | Marchand | June 28, 1949 |
| 2,476,977 | Hansel | July 26, 1949 |
| 2,656,536 | Lockhart | Oct. 20, 1953 |